(12) United States Patent
Coromina et al.

(10) Patent No.: US 7,181,163 B2
(45) Date of Patent: Feb. 20, 2007

(54) MULTI-BEAM SATELLITE COMMUNICATIONS PAYLOAD WITH FLEXIBLE POWER ALLOCATION

(75) Inventors: Frances Coromina, Katwijk (NL); Pierre Waller, Amsterdam (NL)

(73) Assignee: Agence Spatiale Europeenne, Paris Cedex (FR)

( * ) Notice: Subject to any disclaimer, the term of this patent is extended or adjusted under 35 U.S.C. 154(b) by 455 days.

(21) Appl. No.: 10/429,368

(22) Filed: May 5, 2003

(65) Prior Publication Data

US 2004/0224633 A1  Nov. 11, 2004

(51) Int. Cl.
*H04B 7/185* (2006.01)

(52) U.S. Cl. .................. 455/13.4; 455/12.1; 370/316; 370/318; 370/323; 370/325

(58) Field of Classification Search ...... 455/11.1–13.4, 455/427–430, 194.2, 251.1, 253.1, 253.2, 455/293, 298, 299, 341, 343.1, 572, 574; 370/316, 318, 323, 325

See application file for complete search history.

(56) References Cited

U.S. PATENT DOCUMENTS 5,610,556 A * 3/1997 Rubin .................... 330/124 D
5,936,592 A * 8/1999 Ramanujam et al. ....... 343/853
6,091,934 A * 7/2000 Berman et al. ............ 455/13.4
6,799,014 B2 * 9/2004 Rosen et al. ............... 455/12.1
2002/0068526 A1 * 6/2002 Butte et al. ................ 455/13.1

\* cited by examiner

*Primary Examiner*—Edward F. Urban
*Assistant Examiner*—Raymond S. Dean
(74) *Attorney, Agent, or Firm*—Lipsitz & McAllister, LLC

(57) ABSTRACT

A communications payload configuration comprising a multi-port amplifier that incorporates remotely controllable travelling wave tube amplifiers (TWTAs) for allowing their output power to be adjusted depending on the traffic demand and the payload operational conditions. The power delivered by each TWTA is controlled by adjusting the TWTA anode voltage in response to a command signal received from the ground station. If a TWTA fails, the power delivered by each of the remaining TWTAs is increased by gross anode voltage control. The power lost by the failure is thus recovered by increasing the power of the remaining TWTAs. This power control is done in a constant efficiency way by also readjusting the TWTA collector voltages.

7 Claims, 2 Drawing Sheets

MULTI-BEAM SATELLITE COMMUNICATIONS PAYLOAD WITH FLEXIBLE POWER ALLOCATION

BACKGROUND OF THE INVENTION

The present invention relates to multi-beam satellite communications and more specifically to a multi-beam satellite communications payload configuration that allows for efficient and flexible allocation of power to the different high power amplifiers to meet varying traffic conditions or variable link conditions.

The requirement of flexible power allocation is of interest to communications satellite operators for maximizing the overall satellite throughput capabilities and matching the evolution of traffic through the satellite life with the associated increase in revenues.

A common technique for providing flexible power allocation to beams depending on traffic demands consists in using multiport amplifiers in antenna configurations using either a single feed per beam or in focused multi-beam reconfigurable reflector antennas with several feeds contributing to each beam.

The main characteristic of a multi-port amplifier is that the signals corresponding to each input port are first split by an input matrix in such a way that all beam signals are amplified by all the high power amplifiers (HPAs). Therefore, and independently of the beam power distribution, equal loading of all the HPAs is achieved, maximizing the overall DC to RF efficiency. Depending on the beam input considered, the input matrix generates different relative phases at the HPA inputs. Then the output matrix is able to separate again the signals that belong to each input port to the corresponding output port.

One of the main problems associated with this technique is the need of keeping a good phase and amplitude tracking between the different HPAs in order not to degrade the beam isolation performance. This problem becomes more severe as the frequency of operation increases and it is quite serious at Ka band. As a consequence, phase and amplitude control elements are required to correct for the phase and amplitude tracking errors due to temperature and ageing effects.

Another associated problem is the need to implement adequate redundancy units to cope with the eventuality of HPA failures in order to maintain the required total RF power. Therefore, a complex redundancy scheme is required to substitute the failed HPAs by the cold redundant ones. A large number of RF switches are to be implemented with significant impact on output losses, mass, accommodation, reliability and cost. In addition, a multi-port amplifier structure needs to be readjusted in terms of phase and amplitude tracking after the redundancy configuration has been changed, in order to guarantee good RF beam isolation.

Multiport amplifiers have been successfully implemented at L and S bands in different missions. However, the implementation of multi-port amplifier concept to higher frequencies (Ku and Ka bands) is not easy due to the magnification of the problems mentioned before. It is well known that the impact of the above mentioned phase and amplitude tracking errors is alleviated by the use of large order multi-port amplifiers (i.e. 16×16 structures). Nevertheless, cold redundant HPA units and complex reconfiguration switch matrices are still required to keep power and beam isolation within acceptable limits.

U.S. Pat. No. 5,818,388 discloses an apparatus that provides active redundancy, without using redundancy switches, for high power satellite communications payloads. This apparatus uses a number of power amplifiers equal or greater to the number of antenna feed elements to provide extra power at the beginning of life. As power amplifiers fail, the amplitude and phase of the signals driving the remaining power amplifiers are adjusted to maintain antenna performance. In this apparatus, each of the plurality of power amplifiers has a sufficient excess output power capacity at the beginning-of-life point to ensure that, given an anticipated maximum number of power amplifiers failures, performance requirements can be met at an end-of-life point.

U.S. Pat. No. 6,091,934 discloses another technique to ensure dynamic allocation of power to satellite's high power amplifiers to maintain amplifier efficiency and meet peak traffic demands and reduce power consumption during low traffic periods. This is accomplished by monitoring traffic on the channels and allocating available power based on the traffic. Command signals received from a ground station are used to direct the power allocation system to the power amplifiers and adjust the RF power level.

It is also known that the output power from a travelling wave tube amplifier (TWTA) can be adjusted by changing its bias conditions. Recent measurements have proven the possibility of controlling the TWTA saturated power with almost negligible degradation in efficiency. At Ku and Ka bands, 3 dB output power control has been measured with very little (around 2 percentage points) efficiency degradation. This technique is very simple in concept and very well performing. The drawback is the limitation to the case of single feed per beam antenna architectures. Other antenna architectures using overlapping clusters of a few feed per beam are not easily adapted to the use of the flexible TWTA concept.

SUMMARY OF THE INVENTION

The object of the invention is to provide a multi-beam satellite communications system capable of allocating flexible power to the high power amplifiers operating at high frequency band while avoiding the drawbacks of the prior art power allocation systems.

Another object of the invention is to provide a multi-beam satellite communications payload configuration capable of efficient allocation of power to the high power amplifiers without the need of redundant units.

Yet another object of the invention is to provide a method for allocating in an efficient way power to amplifiers in a satellite communications payload.

These objects are accomplished in a communications payload configuration comprising a multi-port amplifier that incorporates remotely controllable travelling wave tube amplifiers (TWTAs) for allowing their output power to be adjusted depending on the traffic demand and the payload operational conditions.

The power delivered by each TWTA is controlled by adjusting the TWTA anode voltage in response to a command signal received from the ground station. If a TWTA fails, the power delivered by each of the remaining TWTAs is increased by gross anode voltage control. The power lost -by the failure is thus recovered by increasing the power of the remaining TWTAs. This power control is done in a constant efficiency way by also readjusting the TWTA collector voltages.

After failure, readjustment of the insertion phase and gain of TWTAs is made by fine helix and fine anode voltage control. Optimum voltages are set for achieving the best RF isolation between ports using the same frequencies.

In order to ensure compensation of ageing effects, small amplitude and phase tracking errors between TWTAs are corrected by fine anode voltage and fine helix voltage control, thereby to improve beam isolation performance. In this way, the TWTA is operated as a controllable phase and amplitude control element, thereby eliminating the need for additional phase shifters and variable attenuators.

By implementing the invention, efficient flexible power allocation is achieved without the need of redundant TWTAs and switches, with associated improvements in output loss, mass, accommodation, reliability and cost of the transmit section.

These and other objects, features and advantages of the present invention will be readily apparent from the following description when considered with the accompanying drawings.

DESCRIPTION OF THE INVENTION

Figure 1:
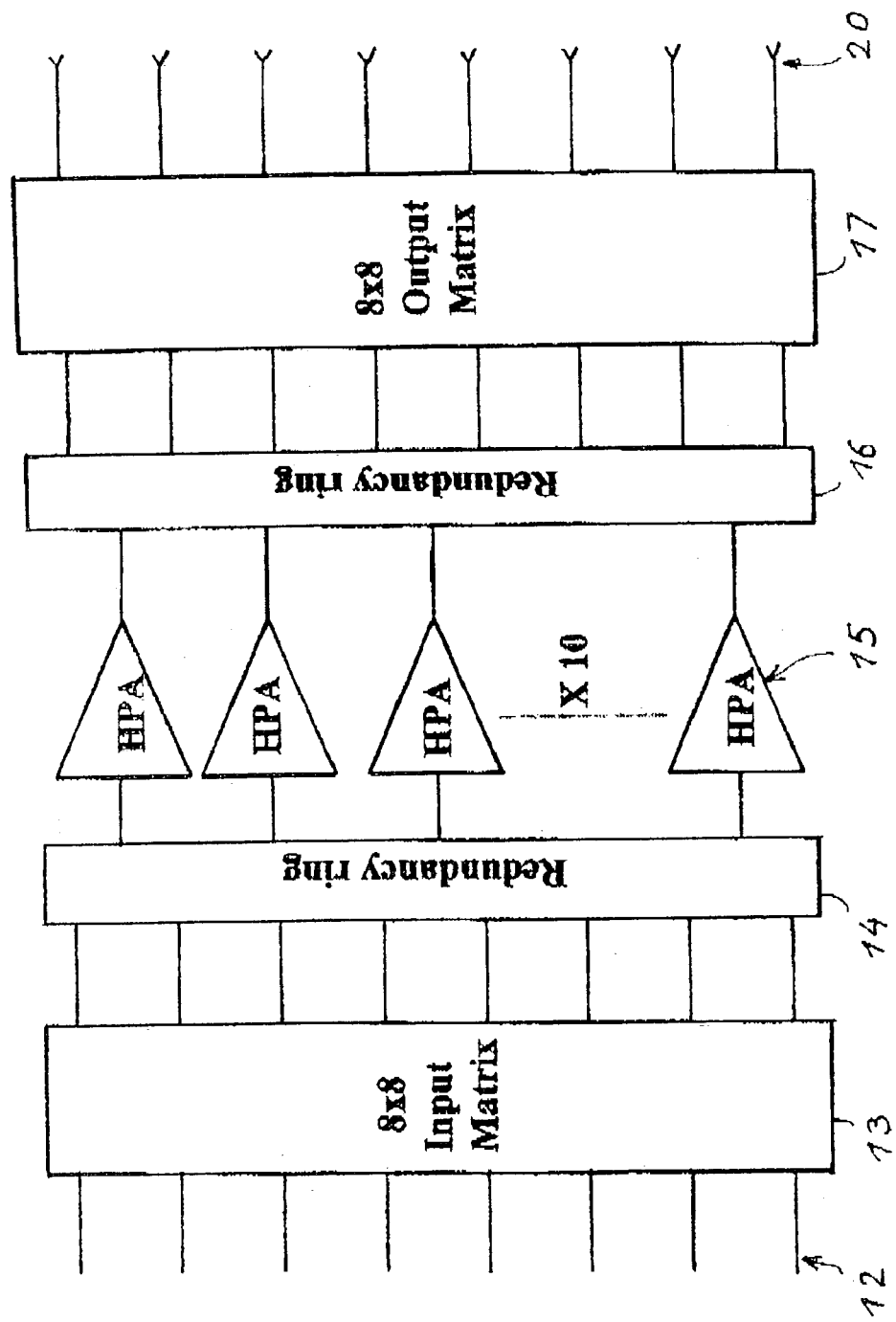
FIG. 1 is a schematic representation of a prior art system for flexible power allocation, using redundant switches.

Referring first to FIG. 1, there is shown a prior art satellite communications apparatus that provides redundancy for allowing flexible power allocation to high power amplifiers. The apparatus includes an input matrix 13 having a plurality of beam inputs, generally indicated by reference numeral 12. The outputs of the input matrix 13 are connected through a first redundancy ring 14 to power amplifiers, generally indicated by reference numeral 15. The outputs of the amplifiers 15 are connected through a second redundancy ring 16 to inputs of an output matrix 17 having its outputs connected to antenna feed elements, generally indicated by reference numeral 20. As noted earlier herein, the implementation of redundancy units results in increasing weight, losses, accommodation, reliability and cost of the satellite's transmit section.

Figure 2:
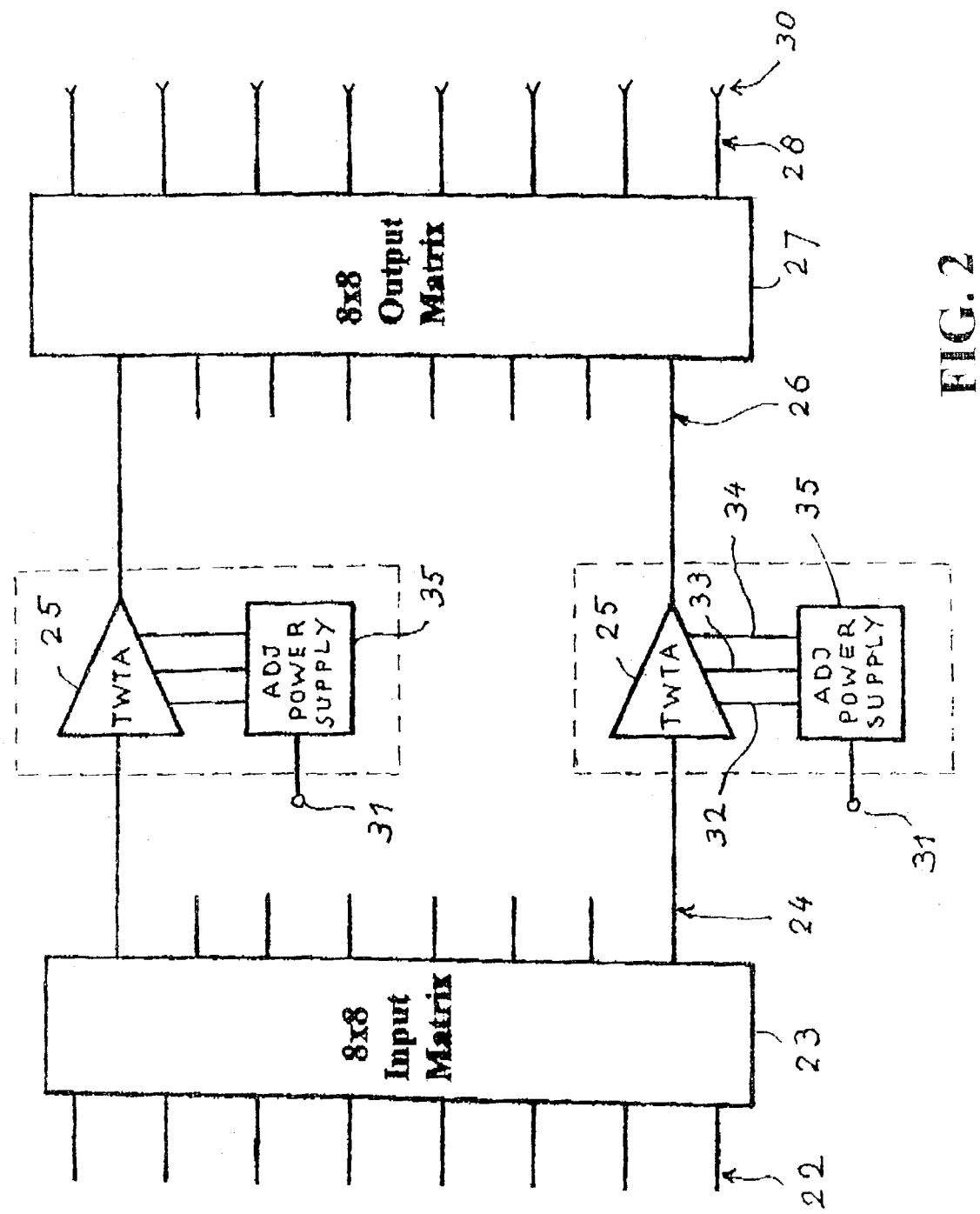
FIG. 2 is a schematic representation of the communications payload configuration of the invention, allowing flexible power allocation without using redundant units.

The present invention uses a different approach that avoids the need for redundancy units. As shown by FIG. 2, the communications payload comprises an multi-port amplifier configuration that includes a plurality of controllable travelling wave tube amplifiers (TWTAs). The configuration comprises an input matrix 23 having a plurality of beam input ports, generally indicated by reference numeral 22, and an equal plurality of output ports, generally indicated by reference numeral 24. Each output port of the input matrix 23 is connected to the input of a respective one of a plurality of controllable travelling wave tube amplifiers (TWTAs) 25. The output of each TWTA 25 is connected to a respective one of a plurality of input ports, generally indicated by reference numeral 26, of an output matrix 27. The output matrix 27 is identical to the input matrix 22. The output matrix 27 has a plurality of output ports, generally indicated by reference numeral 28, which are connected to the antenna feed elements, generally indicated by reference numeral 20.

It will be noted that the number of TWTAs 25 used in the arrangement of FIG. 2 is equal to the number of inputs and the number of antenna feed elements. Each TWTA has an anode terminal 32, a collector terminal 33 and a helix terminal 34. The power supplied to each controllable TWTA is regulated by a respective adjustable power supply 35 in accordance with command signals Vc received from a ground station and applied to its command terminal 32. When such command signals Vc are received, the power supply 35 adjusts the anode voltage applied to the anode terminal 32 and the collector voltage applied to the collector terminal 33 of the respective TWTA, thereby to adjust the power delivered by said TWTA in accordance with the remote command signals. In case of failure of a TWTA, the command signals applied to the power supplies controlling the remaining TWTAs causes the power delivered by same to be increased. The anode voltage adjustment causes the saturation RF power to be adjusted. The collector voltage adjustment causes the power control to be effected in a constant efficient way, whereby optimization of the RF efficiency is obtained.

After failure of a TWTA, the insertion phase and gain of the remaining TWTAs are readjusted by fine adjustment of the anode voltage applied to their anode terminals 32 and fine adjustment of the voltage applied to their helix terminals 34 in response to the command signals Vc applied to the command terminal 31 of the respective power supplies 35. Optimum voltages are set for ensuring the best RF isolation between ports using the same frequencies.

Small amplitude and phase tracking errors between TWTAs are compensated by fine anode voltage and fine helix voltage control in response to the command signal applied to the respective power supplies, whereby the beam isolation performance is improved. In this way, each TWTA is operated as a controllable phase and amplitude control element, thereby eliminating the need for additional phase shifters and variable attenuators.

Analysis performed have shown the feasibility of implementing a 16×16 output power matrix associated with TWTAs able to recover the power lost by four TWTA failures, without any TWTA redundancy. Four failures out of 16 TWTAs is equivalent to 2.5 dB loss. Such a power loss is within reach of the capabilities of flexible TWTAs. Preliminary simulations have shown that, after two TWTAs having failed out of sixteen, a RF isolation of close to 20 dB is obtained between ports using the same frequencies. Such a performance was simulated using only phase compensation. Better performance is to be expected if amplitude control is also implemented using fine anode voltage adjustment.

It will be understood by those skilled in the art to which the present invention relates that variations and alternative embodiments can be made without departing from the spirit and scope of the invention as defined by the appended claims.

What is claimed is:

1. A high power satellite communications payload using multi-beam antennas, including a multi-port amplifier configuration, comprising:

an input matrix having a plurality of beam input ports and a plurality of output ports, a plurality of controllable TWTAs, each having an input and an output, and having an anode terminal, a collector terminal and a helix terminal, said input being connected to a respective one of said plurality of output ports of the input matrix, an output matrix having a plurality of input ports and a plurality of output ports, each input port thereof being connected to the output of a respective one of said plurality of TWTAs, each output port being connected to a respective feed element of an antenna, a plurality of adjustable power supplies, each being assigned to a respective one of said TWTAs, each of said plurality of power supplies having an input connected to receive a remote command signal and at least one output connected to apply adjustable bias voltages to the respective TWTA in accordance with said command signal;

wherein the adjustable power supplies adjust an amount of power allocated to each of said plurality of TWTAs in accordance with said command signal to compensate for a failure condition of one of said TWTAs.

2. The communications payload of claim 1, wherein each of said plurality of power supplies applies a bias voltage to adjust the anode voltage of the respective TWTA in accordance with said command signal.

3. The communications payload of claim 1, wherein each of said plurality of power supplies further applies a bias voltage to adjust the collector voltage of the respective TWTA in accordance with said command signal.

4. The communications payload of claim 1, wherein each of said plurality of power supplies further applies a bias voltage to the helix terminal of the respective TWTA in accordance with said command signal.

5. A method of operating high power amplifiers in a satellite communications payload using multi-beam antennas, the communications payload comprising a multi-port amplifier configuration including an input matrix having a plurality of beam input ports and a plurality of output ports, a plurality of controllable TWTAs, each having an input and an output, and having an anode terminal, a collector terminal and a helix terminal, said input being connected to a respective one of said plurality of output ports of the input matrix, an output matrix having a plurality of input ports and a plurality of output ports, each input port thereof being connected to the output of a respective one of said plurality of TWTAs, each output port being connected to a respective feed element of an antenna, and a plurality of adjustable power supplies, each being assigned to a respective one of said TWTAs, each of said plurality of power supplies having an input connected to receive a remote command signal and at least one output connected to apply adjustable bias voltages to the respective TWTA in accordance with said command signal, the method comprising the steps of:

applying the remote command signal to each of said adjustable power supplies in response to a failure condition of one of said TWTAs, adjusting an amount of power allocated to each of said plurality of TWTAs that remain active in accordance with said remote command signal applied to the respective one of said adjustable power supplies.

6. The method of claim 5, wherein said power allocating step includes the step of applying a collector bias readjustment to each active TWTA in accordance with the command signal applied to the respective adjustable power supply to increase the power of each of said active TWTAs.

7. The method of claim 5, wherein said power allocating step includes the step of applying a fine anode and a fine helix voltage adjustment to each active TWTA, in accordance with the command signal applied to the respective adjustable power supplies to correct phase and amplitude tracking errors of said active TWTAs.

* * * * *

UNITED STATES PATENT AND TRADEMARK OFFICE
CERTIFICATE OF CORRECTION

| | |
|---|---|
| PATENT NO. | : 7,181,163 B2 |
| APPLICATION NO. | : 10/429368 |
| DATED | : February 20, 2007 |
| INVENTOR(S) | : Coromina et al. |

It is certified that error appears in the above-identified patent and that said Letters Patent is hereby corrected as shown below:

On the title page item (75) Inventors, correct the first inventor's name to read: Francesc Coromina Signed and Sealed this Twentieth Day of November, 2007

JON W. DUDAS
*Director of the United States Patent and Trademark Office*